US009645861B2

(12) United States Patent
Lau et al.

(10) Patent No.: US 9,645,861 B2
(45) Date of Patent: May 9, 2017

(54) METHOD AND SYSTEM FOR MANAGING AND PRESENTING MULTIPLE APPLICATION CONTAINERS AS A SINGLE LOGICAL CONTAINER

(71) Applicant: Good Technology Holdings Limited, Waterloo (CA)

(72) Inventors: Alex Lau, Markham (CA); Namrata Jayant Bandekar, Newmarket (CA); Chun Fung Yuen, Mississauga (CA); Wing Young Lam, Richmond Hill (CA)

(73) Assignee: Good Technology Holdings Limited, Waterloo, Ontario (CA)

( * ) Notice: Subject to any disclaimer, the term of this patent is extended or adjusted under 35 U.S.C. 154(b) by 458 days.

(21) Appl. No.: 14/264,276

(22) Filed: Apr. 29, 2014

(65) Prior Publication Data

US 2015/0309849 A1  Oct. 29, 2015

(51) Int. Cl.
*G06F 21/00* (2013.01)
*G06F 9/54* (2006.01)
(Continued)

(52) U.S. Cl.
CPC ............ *G06F 9/54* (2013.01); *G06F 3/04842* (2013.01); *G06F 9/45508* (2013.01); *G06F 9/468* (2013.01); *G06F 21/52* (2013.01); *G06F 21/53* (2013.01); *G06F 21/54* (2013.01); *G06F 21/57* (2013.01)

(58) Field of Classification Search
CPC combination set(s) only.
See application file for complete search history.

(56) References Cited

U.S. PATENT DOCUMENTS 6,044,466 A  3/2000 Anand et al.
7,127,605 B1  10/2006 Montgomery et al.
(Continued)

FOREIGN PATENT DOCUMENTS

WO  2014014879  1/2014

OTHER PUBLICATIONS

Yialelis, et al., "A Security Framework Supporting Domain-Based Access Control in Distributed Systems," Proceedings of the SNDSS 1996, Feb. 22, 1996, 14 pages.
(Continued)

*Primary Examiner* — Ghazal Shehni
(74) *Attorney, Agent, or Firm* — Fish & Richardson P.C.

(57) ABSTRACT

A method for managing application containers, comprising: assigning a first application to a master container in a memory of a system; assigning a second application to a slave container in the memory; using a processor, assigning the master and slave containers to a container group by: delegating access to container meta-data of the slave container by a container run-time of the slave container or by the first application to a container meta-data accessor of the master container via a class loader of the master container; and, delegating interaction between the container run-time of the slave container and a container management channel of the slave container to a container management channel of the master container via the class loader of the master container; and, accessing the first and second applications via the container group.

22 Claims, 6 Drawing Sheets

(51) Int. Cl.
*G06F 3/0484* (2013.01)
*G06F 9/455* (2006.01)
*G06F 9/46* (2006.01)
*G06F 21/52* (2013.01)
*G06F 21/53* (2013.01)
*G06F 21/54* (2013.01)
*G06F 21/57* (2013.01)

(56) References Cited

U.S. PATENT DOCUMENTS

| | | | | |
|---|---|---|---|---|
| 8,769,478 B2* | 7/2014 | Gold | ................... | G06F 15/167 |
| | | | | 717/101 |
| 2005/0044148 A1* | 2/2005 | Son | ................... | G06F 17/30569 |
| | | | | 709/205 |
| 2009/0119672 A1 | 5/2009 | Bussard et al. | | |

OTHER PUBLICATIONS

International Search Report issued in International Application No. PCT/US2015/028085 on Aug. 12, 2015.

* cited by examiner

METHOD AND SYSTEM FOR MANAGING AND PRESENTING MULTIPLE APPLICATION CONTAINERS AS A SINGLE LOGICAL CONTAINER

FIELD

This invention relates to the field of software application containers, and more specifically, to a method and system for managing and presenting multiple application containers.

BACKGROUND

Data processing systems include a wide variety of items, including computing device, network devices, mobile devices, cellular telephones, smartphones, cameras, music and video players, tablets, personal computers, desktop computers, servers, etc. Such devices often include communications capabilities, including for voice and/or data communications, including text messaging, emails, facsimiles, etc. In addition, such devices may include web browser software for browsing Internet websites. Such devices often include the ability to download a wide variety of files from the Internet or other sources, including without limitation files including text, pictures, videos, music, spreadsheets, etc. The use of such devices to run a variety of applications has increased. In addition, the need for multiple users to run applications on a single device has increased. As such, it has become important to have effective methods and systems to manage the use of multiple applications on a device by different users.

Exploitation of computing devices is an ever increasing problem in today's mobile workforce environment. Bring-your-own-device ("BYOD") trends are accelerating in today's everything-mobile environment. One disadvantage for today's users is that they have to carry multiple devices to stay connected to every aspect of their lives. The advent of consumerization has led employees to demand a greater say in the devices, applications and carriers they use at work. They either tend to regard company-issued mobile phones as their own, or they are looking to bring personal devices into the workplace to help them manage their day—but few are prepared to juggle two separate handsets nowadays. Information Technology ("IT") departments are struggling to react to the pace of change that these new types of hardware and operating systems pose in the enterprise environment. Data security is a particular concern as currently devices are used interchangeably for private and professional purposes, without proper restrictions placed on data access both on and off the device. At the moment, the frontier between personal and business devices is blurred, while smart phones are increasingly used for work purposes.

More specifically, a growing number of employees are already using their own phones for work-related activities. Studies have shown that up to 60% of companies now allow their employees to use personal smart phones and tablets at work, the trend known as BYOD. However, using the same device for work and private purposes may be problematic. For example, using your business phone to store your personal contacts means that these may end up in the company's backup base, raising privacy concerns. Furthermore, having company data on a personal device raises the likelihood that disclosure of the company data outside of company communication channels may occur.

Existing mobile device management ("MDM") and mobile application management ("MAM") solutions are greatly complicated by an increasing demand by users for BYOD. On the one hand, enterprises need to ensure that data is secured and under the control of the enterprise, but on the other hand, users want to retain control of device data that is personal in nature. This conflict has given rise to recent technological advances in applying MAM to applications, which is often referred to as "containerization" or "sandboxing".

Application containers play an important part in existing BYOD solutions, as they allow users to retain control of data at rest ("DAR") and data in transit ("DIT") that is personal in nature while relinquishing control to data that is owned by the enterprise or corporate IT department.

Driven by the demand for "multiple-persona on a single device" functionality, application containers are used to support multiple container instances on a single device. However, one disadvantage of current implementations is that they present containers to the user as distinct entities, each having their own container state. For example, a user going from one container to another may require an explicit action to re-authenticate through a lock screen.

SUMMARY

An object of the present invention is to provide a method and system for managing and presenting multiple application containers to obviate or mitigate at least one of the above-presented disadvantages.

According to one aspect of the invention, there is provided a method for managing application containers, comprising: assigning a first application to a master container in a memory of a system; assigning a second application to a slave container in the memory; using a processor, assigning the master and slave containers to a container group by: delegating access to container meta-data of the slave container by a container run-time of the slave container or by the first application to a container meta-data accessor of the master container via a class loader of the master container; and, delegating interaction between the container run-time of the slave container and a container management channel of the slave container to a container management channel of the master container via the class loader of the master container; and, accessing the first and second applications via the container group.

According to another aspect of the invention, there is provided a method for managing application containers, comprising: using a processor, assigning a master container in a memory of a system and a slave container in the memory to a container group by: delegating access to container meta-data of the slave container by a container run-time of the slave container or by any application assigned to the master container to a container meta-data accessor of the master container via a class loader of the master container; and, delegating interaction between the container run-time of the slave container and a container management channel of the slave container to a container management channel of the master container via the class loader of the master container; and, accessing any application assigned to one or more of the master container and the slave container via the container group.

In accordance with further aspects of the invention there is provided an apparatus such as a data processing system, computing device, network device, mobile device, or server, a method for adapting same, as well as articles of manufacture such as a computer readable medium or product and a computer program product or software product (e.g., comprising a non-transitory medium) having program instructions recorded or stored thereon for practicing the method of the invention.

BRIEF DESCRIPTION OF THE DRAWINGS

The foregoing and other aspects will be more readily appreciated having reference to the drawings, wherein.

DESCRIPTION

The present invention can be implemented in numerous ways, including as a process or method; an apparatus; a system; a device; a composition of matter; a computer program product embodied on a computer readable storage medium; and/or a processor, such as a processor configured to execute instructions stored on and/or provided by a memory coupled to the processor. In this description, these implementations, or any other form that the invention may take, may be referred to as techniques. In general, the order of the steps of disclosed processes may be altered within the scope of the present invention. Unless stated otherwise, a component such as a processor or a memory described as being configured to perform a task may be implemented as a general component that is temporarily configured to perform the task at a given time or a specific component that is manufactured to perform the task. As used herein, the term "processor" refers to one or more devices, circuits, and/or processing cores configured to process data, such as computer program instructions.

A detailed description of one or more embodiments of the present invention is provided below along with accompanying figures that illustrate the principles of the invention. The present invention is described in connection with such embodiments, but the present invention is not limited to any embodiment. The scope of the present invention is limited only by the claims and the present invention encompasses numerous alternatives, modifications and equivalents. Numerous specific details are set forth in the following description in order to provide a thorough understanding of the present invention. These details are provided for the purpose of example and the invention may be practiced according to the claims without some or all of these specific details. For the purpose of clarity, technical material that is known in the technical fields related to the claimed invention has not been described in detail so that the present invention is not unnecessarily obscured.

In this description and in the claims, the use of the articles "a", "an", or "the" in reference to an item is not intended to exclude the possibility of including a plurality of the item in some embodiments. It will be apparent to one skilled in the art in at least some instances in this description and the attached claims that it would be possible to include a plurality of the item in at least some embodiments.

Figure 1:
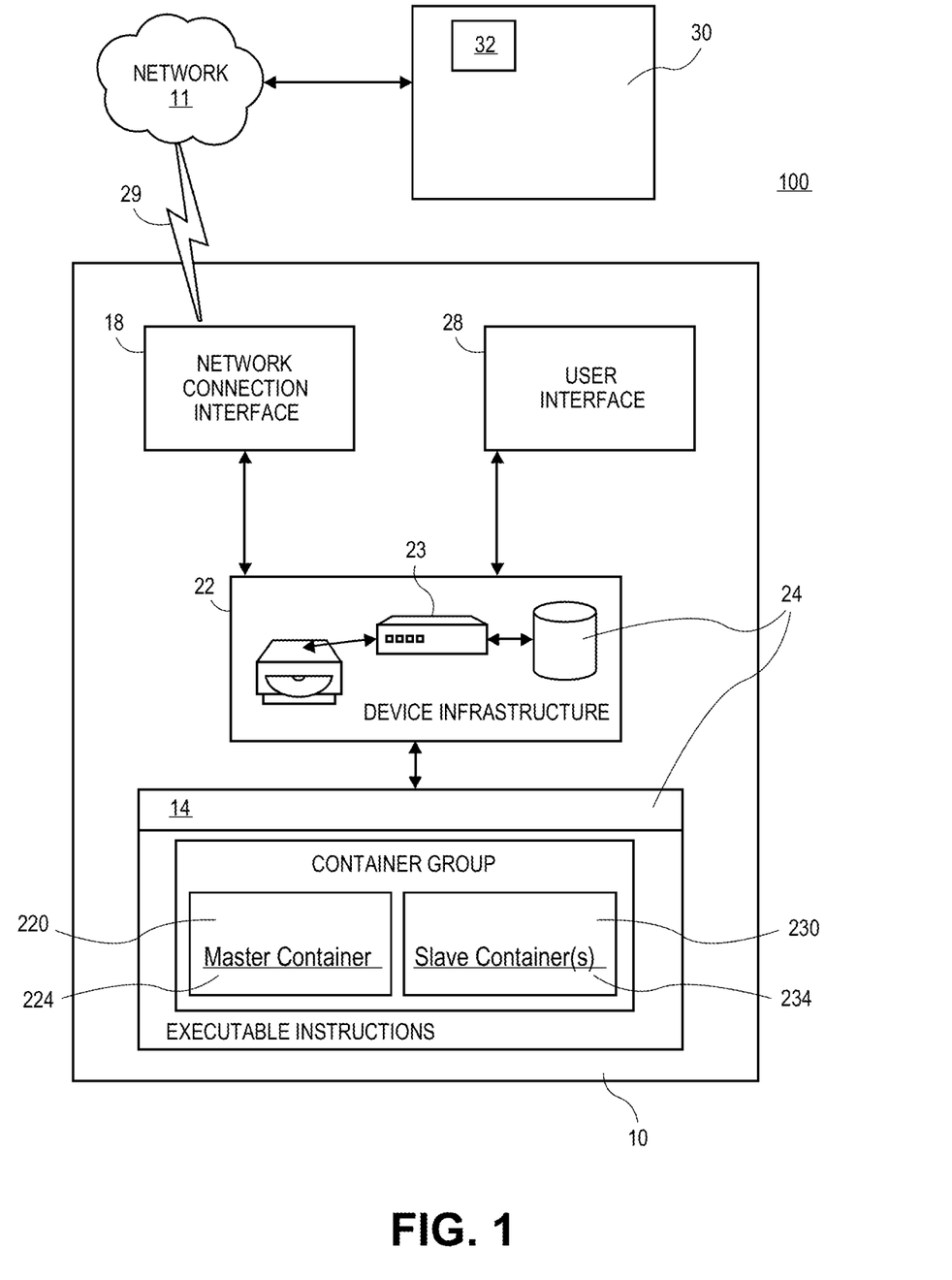
FIG. 1 is a block diagram illustrating an example configuration of a distributed data processing system.

FIG. 1 is a block diagram illustrating an example configuration of a distributed data processing system 100. The system 100 includes one or more data processing systems or network devices 10 coupled to one or more other data processing systems or servers 30 over a network 11. For example, the device 10 may be a fixed or mobile computing device including a desktop computer, a notebook computer, or a wireless device such as a mobile device, mobile telephone, notepad, etc., and the server 30 may be fixed or mobile computing device including as a desktop computer, etc. The components of the device 10 and the server 30 may be similar. The server 30 may be considered to be a device 10.

FIG. 1 shows an example device infrastructure 22 for a device 10 including a network connection interface 18, such as a network interface card (e.g., a SIM card) or a modem, coupled to the device infrastructure 22. The network connection interface 18 is connectable during operation of the device 10 to the network 11 (e.g., an intranet and/or an extranet such as the Internet), which enables the device 10 to communicate with other devices (e.g., server 30) as appropriate. The network 11 can support the communication of messages 29 and related content. As mentioned above, it is recognized that the device infrastructure 22 can be implemented on the device 10 and the server 30.

The device 10 can also have a user interface 28, coupled to the device infrastructure 22, to interact with a user (not shown). The user interface 28 can include one or more user input devices such as but not limited to a QWERTY keyboard, a keypad, a stylus, a mouse, a microphone, a gesture recognition input device and a user output device such as a display (e.g., a liquid crystal display ("LCD") screen) and/or a speaker. If the screen is touch sensitive, then the display can also be used as the user input device as controlled by the device infrastructure 22.

Operation of the device 10 is facilitated by the device infrastructure 22. The device infrastructure 22 includes one or more computer processors, processors, or central processing units (CPU) 23 and can include an associated storage or memory 24. The CPU 23 facilitates performance of the device 10 configured for the intended task (e.g., of the respective applications or modules (e.g., 14, 32)) through operation of the network interface 18, the user interface 28, and other application programs/hardware of the device 10 by executing task related instructions. These task related instructions can be provided by the operating system, and/or software applications/modules (e.g., 14, 32) located in the memory 24, and/or by operability that is configured into the electronic/digital circuitry of the processor(s) designed to perform the specific task(s). Further, it is recognized that the device infrastructure 22 can include a computer readable storage medium coupled to the CPU 23 for providing instructions to the CPU 23 and/or to load/update the instructions. The computer readable medium can include hardware and/or software such as, by way of example only, flash memory, optically readable medium such as CD/DVD, ROMs, and memory cards. In each case, the computer readable medium may take the form of a small disk, hard disk drive, solid-state memory card, or RAM provided in the memory 24. It should be noted that the above listed example computer readable mediums can be used either alone or in combination.

Further, it is recognized that the device 10 can include executable applications/modules (e.g., 14, 32) comprising code or machine readable instructions for implementing predetermined functions/operations including those of an operating system and modules, for example. The CPU 23 as used herein is a configured device and/or set of machine-readable instructions for performing operations as described by example below, including those operations as performed by any or all of the applications/modules 14, 32 firmware and/or operating system. As used herein, the CPU 23 may comprise any one or combination of, hardware, firmware, and/or software. The CPU 23 acts upon information by manipulating, analyzing, modifying, converting or transmitting information for use by an executable procedure or an information device, and/or by routing the information with respect to an output device. The CPU 23 may use or comprise the capabilities of a controller or microprocessor, for example. Accordingly, any of the functionality of the applications/modules may be implemented in hardware, software or a combination of both. Accordingly, the use of a CPU 23 as a device and/or as a set of machine-readable instructions may be referred to herein generically as a processor/module for sake of simplicity.

In view of the above description, the memory 24 of the device 10 can be configured for keeping the stored data in order and the principal (or only) operations on the stored data are the addition/amendment of, processing of, or removal of the stored data from memory 24 (e.g., FIFO, LIFO, etc.). For example, the memory 24 can be a linear data structure for containing and subsequent accessing of the stored data and/or can be a non-linear data structure for containing and subsequent accessing of the stored data.

Further, the memory 24 receives various entities such as data that are stored and held to be processed later. As such, the memory 24 can perform the function of a buffer, which is a region of memory used to temporarily hold data while it is being moved from one place to another (i.e., between devices 10, 30). Typically, the data is stored in the memory 24 when moving the data between processes within/between one or more devices 10, 30. It is recognized that the memory 24 can be implemented in hardware, software, or a combination thereof. The memory 24 may be used in the system 100 when there is a difference between the rate/time at which data is received and the rate/time at which the data can be processed (e.g., ultimately by the devices 10, 30).

Further, it will be understood by a person skilled in the art that the memory 24 described herein is the physical place where data can be held in an electromagnetic or optical form for access by the computer processors/modules. There can be two general usages: first, memory is frequently used to mean the devices and data connected to the computer through input/output operations such as hard disk and tape systems and other forms of storage not including computer memory and other in-computer storage such as flash memory. Second, in a more formal usage, memory/storage 24 has been divided into: primary storage, which holds data in memory (sometimes called random access memory or "RAM") and other "built-in" devices such as the processor's cache; and, secondary storage, which holds data on hard disks, tapes, and other devices requiring input/output operations. Primary storage can be faster to access than secondary storage because of the proximity of the storage to the processor or because of the nature of the storage devices. On the other hand, secondary storage can hold much more data than primary storage. In addition to RAM, primary storage includes read-only memory ("ROM"), flash memory, and cache memory. In addition to hard disks, secondary storage includes a range of device types and technologies, including diskettes, flash memory, Zip drives, redundant array of independent disks (RAID) systems, and holographic storage. Devices that hold storage are collectively known as storage media, storage, or memory 24.

A database is one embodiment of memory 24 as a collection of information that is organized so that it can easily be accessed, managed, and updated. In one view, databases can be classified according to types of content: bibliographic, full-text, numeric, and images. In computing, databases are sometimes classified according to their organizational approach. The most prevalent approach is the relational database, a tabular database in which data is defined so that it can be reorganized and accessed in a number of different ways. A distributed database is one that can be dispersed or replicated among different points 10, 30 in a network 11. An object-oriented programming database is one that is congruent with the data defined in object classes and subclasses. Computer databases typically contain aggregations of data records or files, such as transactions, catalogs and inventories, and profiles. Typically, a database manager provides users the capabilities of controlling read/write access, specifying report generation, and analyzing usage. Databases and database managers are prevalent in large mainframe systems, but are also present in smaller distributed workstation and mid-range systems and on personal computers. For example, structured query language ("SQL") is a standard language for making interactive queries from and updating a database.

The memory 24 can also be defined as a physical electronic holding place for instructions and data that the CPU 23 can reach quickly. When the system 10 is in normal operation, its memory usually contains the main parts of the operating system and some or all of the application programs and related data that are being used. Memory is often used as a shorter synonym for random access memory ("RAM") and/or flash memory. This kind of memory can be located on one or more microchips that are physically close to the microprocessor in the system 10.

In terms of a server 30, it is recognized that the network devices 10, 30 can be configured as hardware, software, or typically a combination of both hardware and software to provide a network entity that operates as a socket listener. It is recognised that any computerised process that shares a resource (e.g., data) to one or more client processes can be classified as a server in the system 100. The term "server" can also be generalized to describe a host that is deployed to execute one or more such programs, such that the host can be one or more configured computers that link other computers or electronic devices together via the network 11. The device 30 implementing the functionality of a service can provide specialized services across the network 11 with applications executed on the devices 10, for example to private users inside a large organization or to public users via the Internet 11. In the system 100, the server 30 can have dedicated functionality and/or can share functionality as described. For example, enterprise servers 30 are servers that are used in a business context and can be run on/by any capable computer hardware. In the hardware sense, the word "server" 30 typically designates computer models intended for running software applications under the heavy demand of a network 11 environment. In this client-server configuration one or more machines, either a computer or a computer appliance, share information with each other with one acting as a host for the other. While nearly any personal computer is capable of acting as a network or application server 30, a dedicated server 30 can contain features making it more suitable for production environments. These features may include a faster CPU 23, increased high-performance RAM, and typically more than one large hard drive. More obvious distinctions include marked redundancy in power supplies, network connections, and even the servers themselves.

The server 30 can be represented by physical computer devices (e.g., a configured computer hardware system 10) dedicated to run one or more services (e.g., as a host of the services) to serve the needs of the users of network devices 10 on the network 11. Depending on the computing service (e.g., data processing, data access, etc.) that the server 30 offers, the server 30 could be a database server, file server, mail server, print server, web server, gaming server, or some other kind of server. In the context of client-server architecture, the server 30 can be defined as a computer program running to serve the requests of other programs, the "clients". Thus, the "server" performs some computational task on behalf of "clients". In the present context, the clients run on the network devices 10 and connect through the network 11 with the server 30 affiliated with the client application. It is recognized that the relationship of the client application with its affiliated server 30 is typically done on a one-to-one basis.

As such, the server 30 is capable of acting as a network server for the network device 10 and can contain features (e.g., hardware, software, network connectivity, etc.) making the server 30 more suitable for production environments over the features of the device 10. These features can include a faster CPU 23, increased high-performance RAM, and increased storage capacity in the form of a larger or multiple hard drives, as compared to such features typically had by mobile devices 10. Servers 30 can also have reliability, availability and serviceability ("RAS") and fault tolerance features, such as redundancy in power supplies, storage (as in RAID), and network 11 connections.

The communications network or network 11 comprises a wide area network such as the Internet, however the network 11 may also comprise one or more local area networks 11, one or more wide area networks, or a combination thereof. Further, the network 11 need not be a land-based network, but instead may comprise a wireless network and/or a hybrid of a land-based network and a wireless network for enhanced communications flexibility. The network 11 is used to facilitate network interaction between the devices 10 and the server 30. The network 11 is used to facilitate network interaction between the server 30 and the memory 24 (when configured remotely). In terms of communications (e.g., 29) on the network 11, these communications can be between the systems (e.g. device 10 and device 30) consisting of addressable network packages following a network communication protocol (e.g., TCPIP). It is recognized that mobile devices 10 may not always have stable network connections, and thus may be connected to a network 11 acting as an untrusted or unsecured network (e.g., WiFi hotspot, hostile 3G network, etc.).

A consumer or client application (e.g., 14) is an application or process that requests 29 a service from some other application or process. A service application (e.g., 32) is an application or process that responds 29 to a client (or consumer) application 14 request 29. Many applications 14, 32 can act as both a client and a service, depending on the situation. As such, intercommunication between the applications 14, 32 and/or between the applications 14 and the on-board devices (e.g., user interface 28) can be performed via communicating respective service programming interfaces.

For example, a client application 14 (e.g., an application or module provisioned on the device infrastructure 22 of the device 10) may provide for intercommunication between the server 30 and the device 10 over the network 11, via the network connection interface 18. The client applications 14 may be a client of a service application 32 (e.g., an application or module provisioned on the device infrastructure 22 of the server 30) of the server 30.

Figure 2:
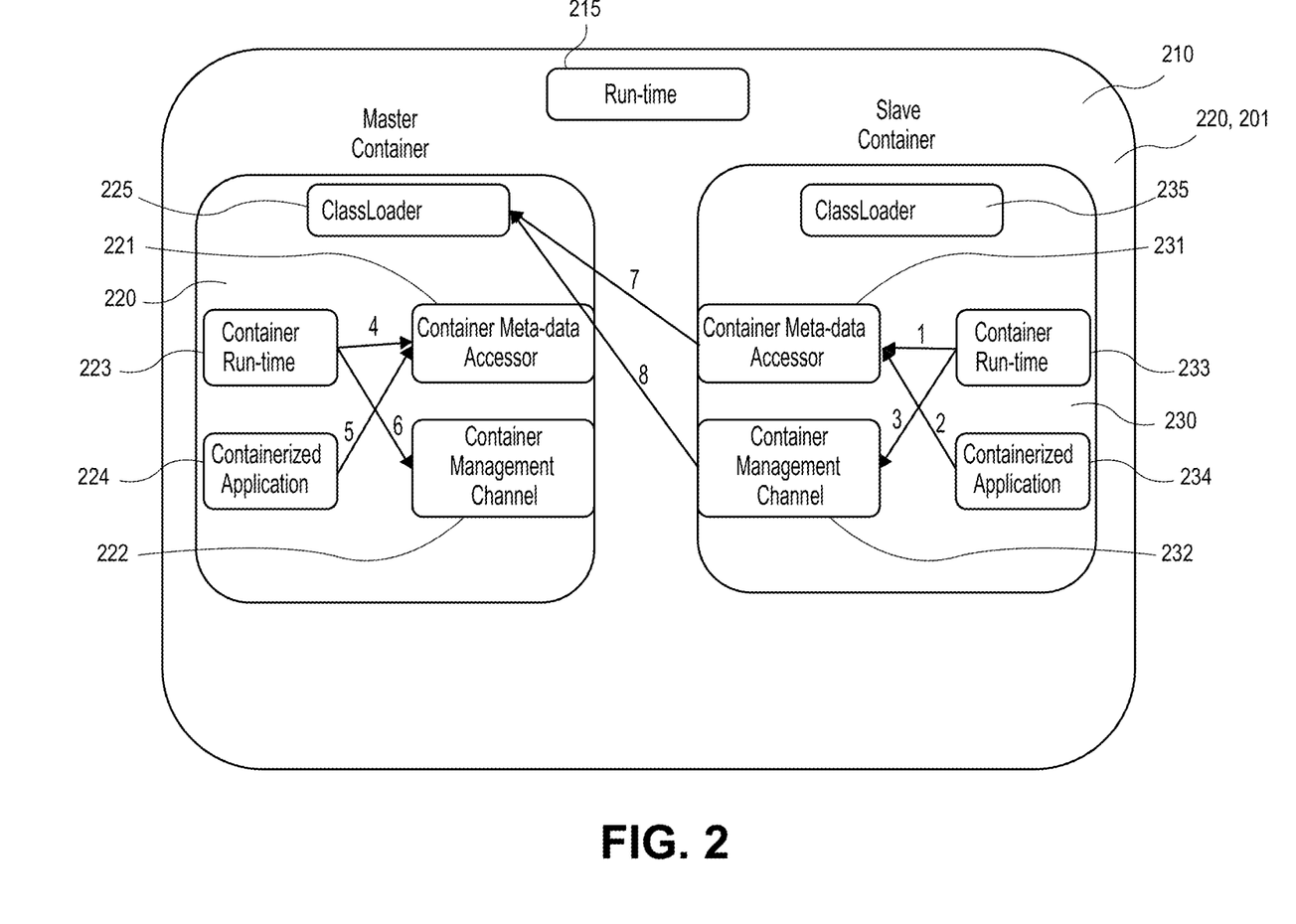
FIG. 2 is a block diagram illustrating components and pathways within the memory of a data processing system for managing and presenting multiple application containers as a single logical container.

According to one embodiment the invention, as described below, there is provided a method and system for presenting multiple application containers 220, 230 as a single logical container 210.

According to one embodiment, there is provided a method for implementing application container that allows multiple container instances to reside on the same mobile device 10 while maintaining that these containers form a single, logical entity both from the perspective of container management and from the perspective of the end-user. For example, the user might want a single "launcher" screen where applications from all containers installed on the device 10 appear. Or, the IT administrator might want to issue a single lock command to all container instances on a mobile device 10 without having the need to explicitly send this same command multiple times.

Having the ability to group application containers on the same device 10, while managing and presenting them as a single entity allows for many more interesting use cases. For example, the perception of an application container that allows applications to be added/removed dynamically can be achieved by adding/removing application containers from a container group.

Grouping application containers on the same mobile devices 10 so that they appear and function like a single logical unit can be accomplished by strategically sharing state and executable code amongst containers in the grouping. In existing methods, this is typically performed via an explicit messaging protocol (possibly through inter-process communication), for example, via "Services" on the Android™ platform. Additional development efforts are usually required as the application containers will need to be coded against this protocol. An explicit messaging protocol between the containers will also incur possible performance degradation as additional machinery needs to be part of the run-time. The present invention allows the grouping of application containers so that they appear and function like a single logical unit without the need to define and implement a messaging protocol. Advantageously, minimal additional development effort is involved for containers to participate in a container group, and the container implementation themselves are oblivious to the fact that they are (or are not) participating in a group.

FIG. 2 is a block diagram illustrating components 200 and pathways 201 within the memory of a data processing system (or device) 10 for managing and presenting multiple application containers (e.g., master container 220, slave container 230) as a single logical container (e.g., container group 210). The present invention allows the definition of container groups 210 on the same device (e.g., 10), where application containers 220, 230 within the same container group 210 can: share container meta-data, such as state, policies and key's without any explicit messaging protocol between the containers 220, 230; and, manage multiple application containers through a single instance of a container management channel, without any explicit messaging protocol between the containers 220, 230. For example, a single "LOCK" command from an external program/agent (which can be either local or remote) is only delivered once, to a single container management channel without the need to broadcast this same command to a group of application containers 220, 230. Note that the management channel may be "active" in the master container 220 described below.

Container groups 210 are useful when a user wants multiple application containers 220, 230 to "behave" like a single logical container, without implementing an explicit messaging framework among the containers 220, 230, such that: a single container management command (e.g., LOCK) has the ability to affect the entire group of containers 210 if desired; and, containers 220, 230 all share the same policy.

Container groups 210 are also useful when a user wants multiple application containers 220, 230 to "appear" like a single logical container to the user. From the user's perspective there is only one container for the entire container group 210: there is a single launcher for a container group 210, where applications 224, 234 from all containers 220, 230 in the group 210 appear in this launcher; and, a user can navigate seamlessly, without authenticating through a lock screen, from application 224 to application 234 regardless as to whether they are in different containers 220, 230 as long as they are in the same container group 210.

Each container 220, 230 in a container group 210 is allowed to run in the same process, but as distinct, isolated applications using the "Class Loader Isolation" technique. Application servers (e.g., Weblogic™, Glassfish™, etc.) use the Class Loader Isolation technique to host multiple, distinct applications within the same process. Class Loader Isolation requires little or no code changes in the applications themselves, commonly the applications are not even aware there are other applications running in the same process. The present invention leverages the Class Loader Isolation technique in the context of creating a container group 210.

In a container group 210, a single container is designated as the "master" 220 and the rest of the containers are designed as "slaves" 230. Access to container meta-data (e.g., state, authentication secret, security policy, etc.) in slave containers 230 is proxied to the master container 220 by means of the "Class Loader Isolation Circumvention" technique. Access to executable code (e.g., Classes) that implements the container management channel is also proxied to the master container 220 by means of the Class Loader Isolation Circumvention technique. One example of the Class Loader Isolation Circumvention technique is the use of reflection methods. A reflection method is a run-time technique that is used to examine and/or modify the structure and values of certain meta-data or properties of the container.

Advantageously, no significant additional development effort is required for containers 220, 230 to be part of a container group 210. An application 224, 234 within the container group 210 is oblivious as to whether it will be executed inside the master 220 or one of the slaves 230. The master and slave containers 220, 230 can be updated independently of each other provided that the application program interface ("API") contract of container meta-data accessor and container management channel remain constant.

Referring again to FIG. 2, the components 200 include a run-time 215 which in turn includes a master container 220 and one or more slave containers 230. The run-time 210 is a system run-time that is able to host applications on the particular platform. According to one embodiment, on the Android™ platform, the run-time 210 is the "process". The master container 220 includes a container meta-data accessor 221, a container management channel 222, a container run-time 223, a containerized application 224, and a class loader 225. Similarly, each slave container 230 includes a container meta-data accessor 231, a container management channel 232, a container run-time 233, a containerized application 234, and a class loader 235.

The container meta-data accessor 221, 231 is the class or set of classes that allows the container run-time and applications read/write access to container meta-data such as policies, container state and authentication secrets.

The container management channel 222, 232 is the class or set of classes that implements the container management channel. A typical container management channel implementation would communicate with a external program, e.g., a local and/or remote management agent, where container management commands are issued when appropriate.

The container run-time 223, 233 is the class or set of classes that manages the behavior of the container 220, 230, for example, transitioning the container state based on certain events such as successful authentication via a lock screen or receiving a container management command.

The containerized application 224, 234 is the class or set of classes that constitutes applications inside a particular container instance.

The class loader 225, 235 is a class loader instance that is responsible for loading classes inside a particular container instance. According to one embodiment, on the Android™ platform, this is the "PathClassLoader".

The container meta-data accessor 221, 231 and the container management channel 222, 232 are understood to be defined without loss of generality, in the sense that any access to container meta-data can be categorized into a set of APIs and named "container meta-data accessor". Similarly, any interaction with the container management channel can be categorized into a set of APIs and implementation named "container management channel implementation".

The operations or pathways 201 between the components 200 include the following. First, the container run-time 223, 233 reads and writes container meta-data via pathways 1 and 4. The containerized application 224, 234 reads and writes container meta-data via pathways 2 and 5. The container run-time 223, 233 interacts with the container management channel 222, 232 via pathways 3 and 6.

In the case of slave containers 230, when the container run-time 233 and/or containerized application 234 accesses container meta-data via path-ways 1 and 2, the invocation is actually delegated to the master container's container meta-data accessor 221 of the master container 220 via pathway 7. This delegation is achieved by Class Loader Isolation Circumvention wherein the class loader 225 from the master container 220 is fetched and from which an instance of the master container's meta-data accessor 221 may be obtained. According to one embodiment, on the Android™ platform, this is accomplished by using the "Package Context" of the master container 220.

Similarly, also in the case of slave containers 230, when the container run-time 233 interacts with the container management channel 232 via pathway 3, the invocation is actually delegated to the container management channel 222 of the master container 220 via pathway 8. This delegation is achieved by the Class Loader Isolation Circumvention wherein the class loader 225 from the master container 220 is fetched and from which class instances that contain executable code that implement the container management channel 222 of the master container 220 may be obtained. According to one embodiment, on the Android™ platform, this is accomplished by using the "Package Context" of the master container 220.

Figure 3:
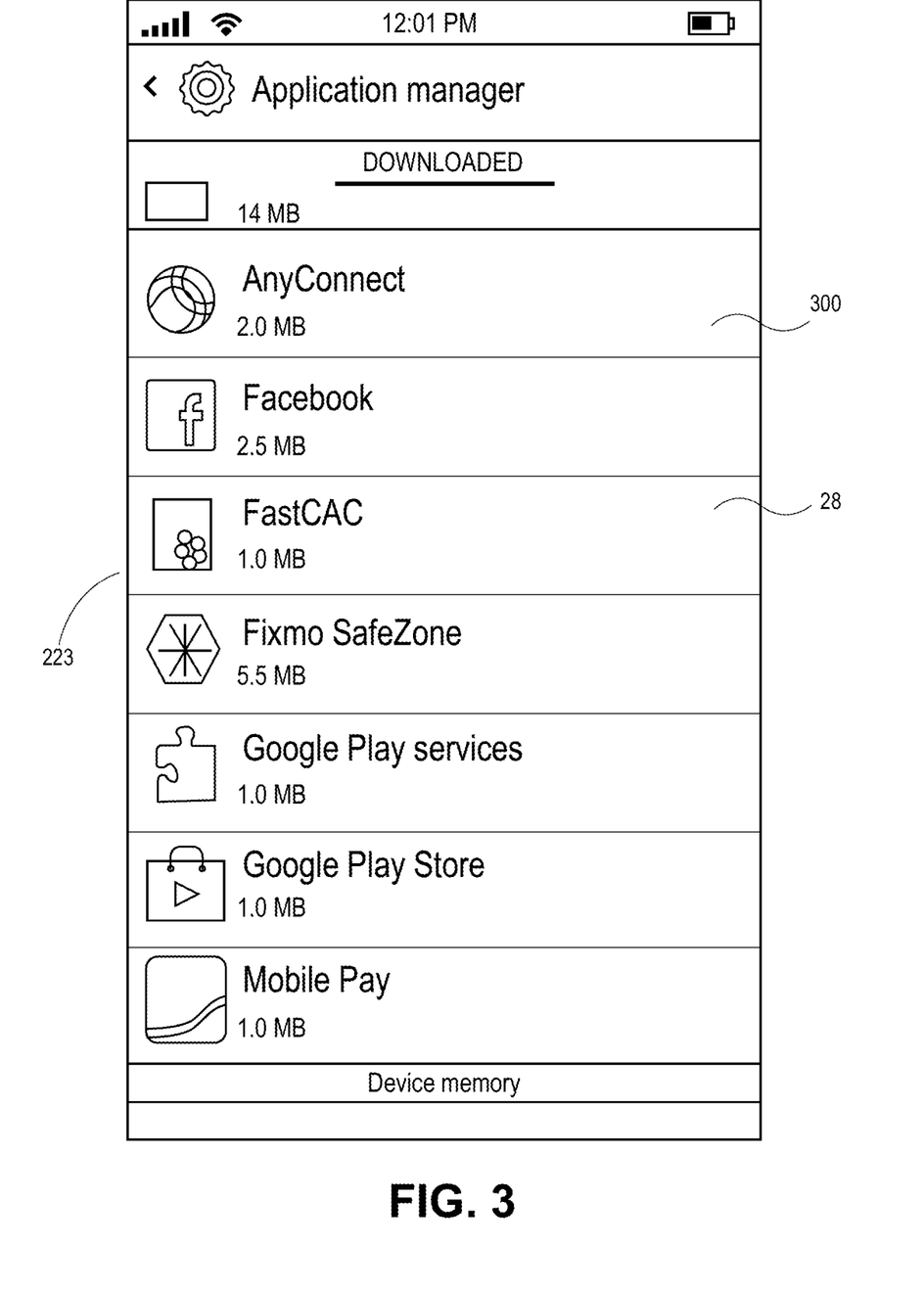
FIG. 3 is a screen capture illustrating an application manager screen.
Figure 4:
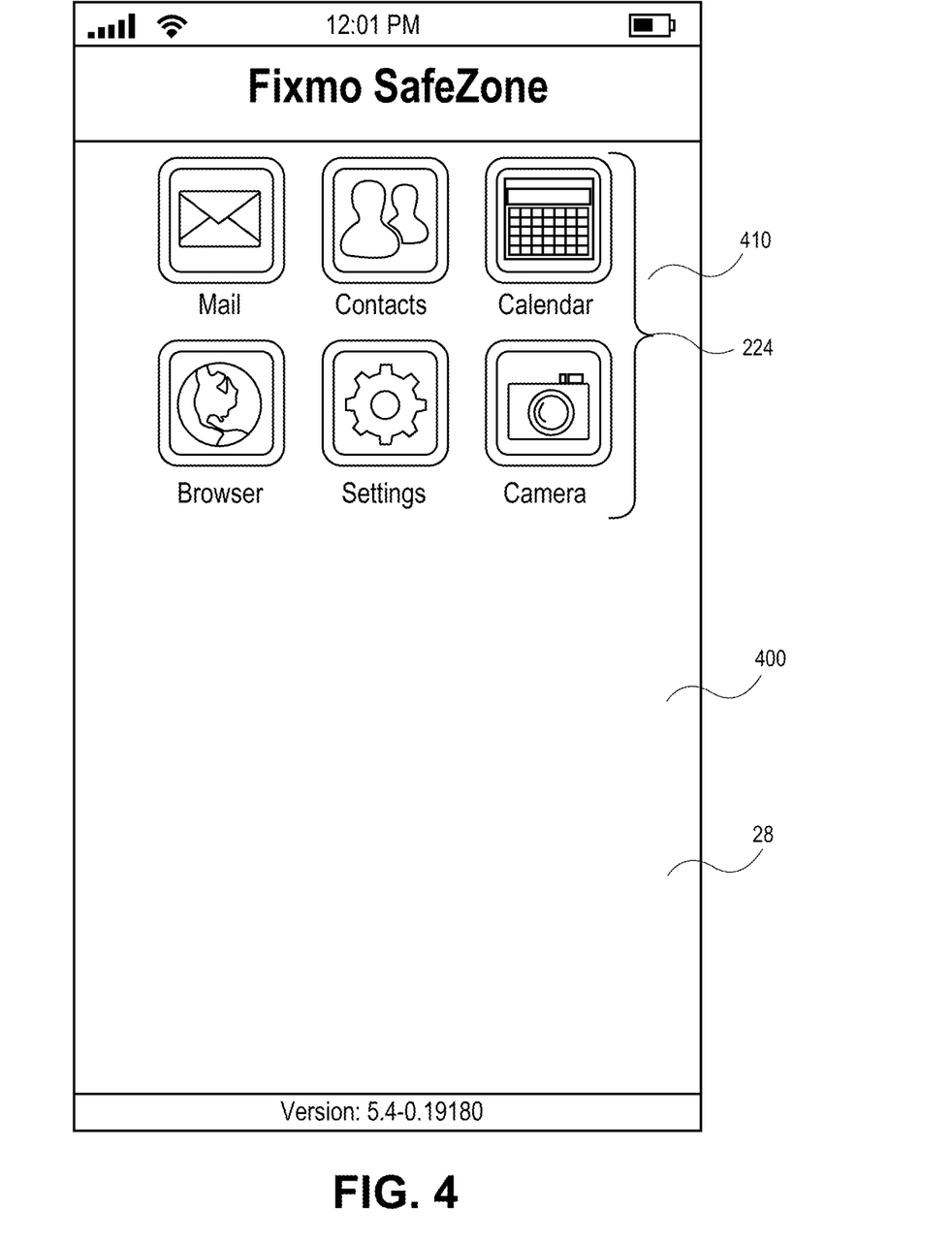
FIG. 4 is a screen capture illustrating a landing page screen.
Figure 5:
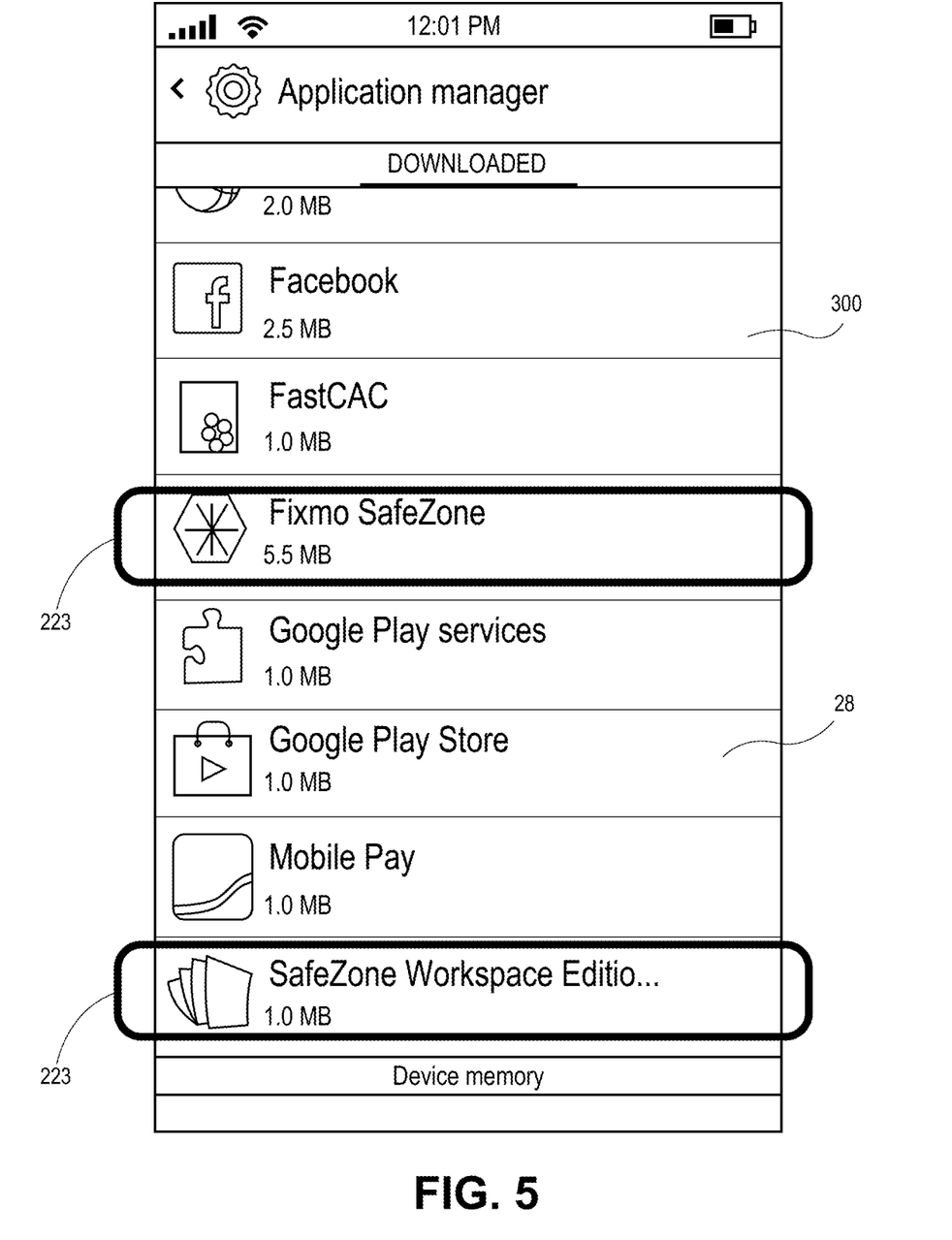
FIG. 5 is a screen capture illustrating a selection to master and slave container run-times on the application manager screen of FIG. 3; and, FIG. 6 is a screen capture illustrating the landing page screen of FIG. 4 for the master and slave container run-times selected in FIG. 5.
Figure 6:
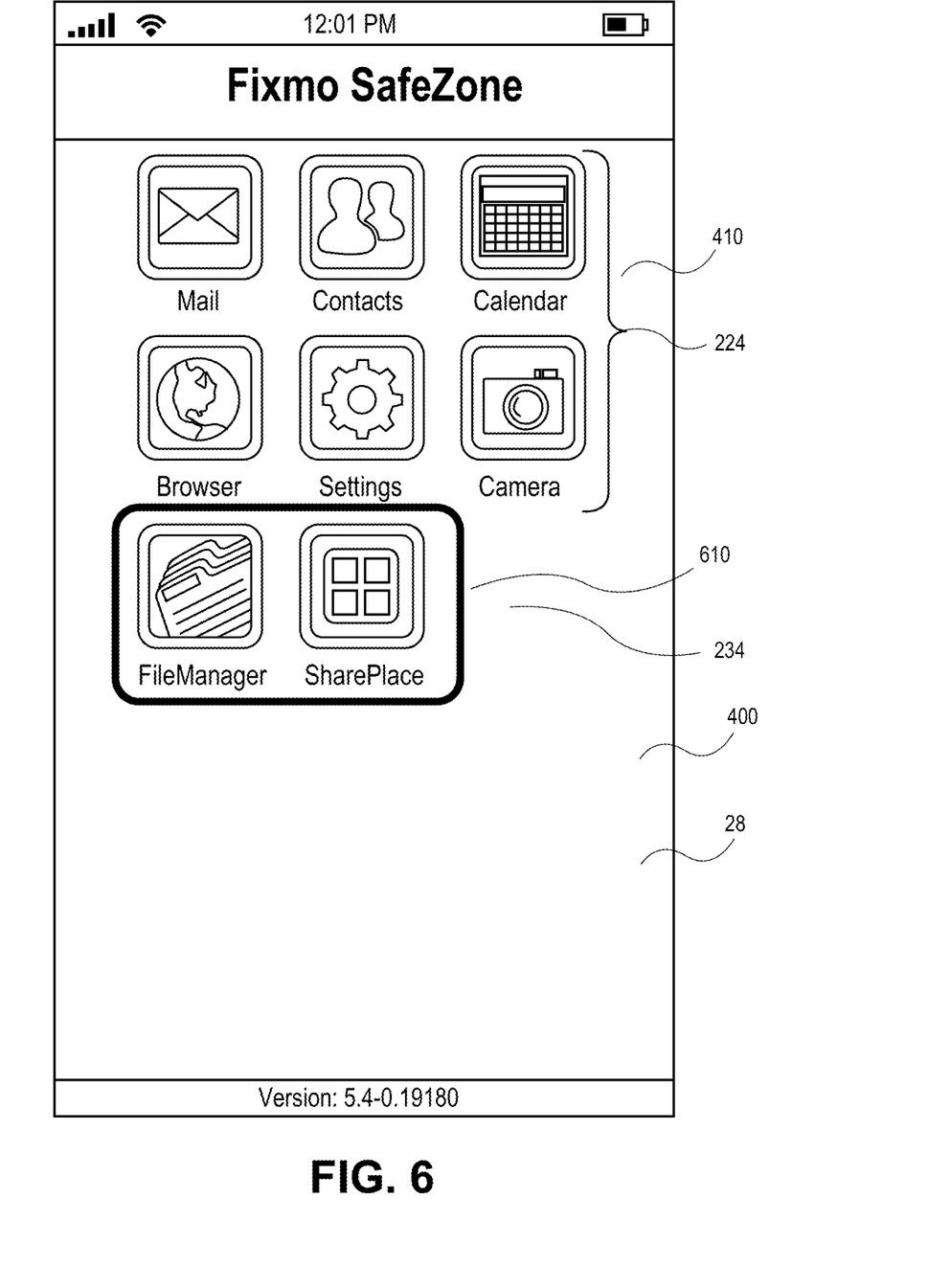

FIG. 3 is a screen capture illustrating an application manager screen 300; FIG. 4 is a screen capture illustrating a landing page screen 400; FIG. 5 is a screen capture illustrating a selection of master and slave container run-times 223, 233 on the application manager screen 300 of FIG. 3; and, FIG. 6 is a screen capture illustrating the landing page screen 400 of FIG. 4 for the master and slave container run-times 223, 233 selected in FIG. 5. In FIG. 3, a screen capture of the Android™ application manager, where a list of applications that are currently installed on the device 10, is shown. In FIG. 3, "Fixmo SafeZone" is the master container run-time 223 manifested as an Android™ application. In FIG. 4, the containerized applications 224 relating to the master container 230 include the "Mail", "Contacts", "Calendar", "Browser", "Settings", and "Camera" applications. In FIG. 5, similar to FIG. 3, "Fixmo SafeZone" and "SafeZone Workspace Edition" are the master container run-time 223 and a slave container run-time 233, respectively, manifested as Android™ applications. In FIG. 6, similar to FIG. 4, the containerized applications 234 relating to the slave container 230 include the "FileManager" and "SharePlace" applications.

According to one embodiment, the present invention may be used to implement container expansion packs. In particular, an application container that supports dynamically adding/removing applications in the form of "expansion packs" may be implemented using a container group 210. First, a master container 220 with a base set of applications 224 may be designated, where the base set of applications 224 is immutable. Next, an unlimited number of slave containers 230, also known as expansion packs may be added to the container group 210, each with its own set of applications 234. The user will only ever interact with the launcher (e.g., an Android™ user interface 28) from the master container 220. The launcher can read the manifest of slave containers 230 in the same group 210 because container meta-data is implicitly shared between the containers 220, 230, thus having the ability to launch applications in any of the slave containers 230 as well as its own. Navigating from application 224 to application 234, regardless as to whether the applications 224, 234 are in different containers 220, 230 in the group 210 does not require the user to re-authenticate because container state is shared, that is, the containers 220, 230 are locked/unlocked as a whole.

Referring again to FIGS. 3-6, an initial state of an application manager screen 300 is shown in FIG. 3 and an initial state of a landing screen 400 is shown in FIG. 4. The icons 410 shown in the landing screen 300 represent applications 224 that may be contained in a master container 220 for the "Fixmo SafeZone" run-time 223. FIG. 5 shows the selection of the "Fixmo SafeZone" run-time 223 and the "SafeZone Workspace Edition" expansion pack run-time 233 in the application manager screen 300 of FIG. 3. The "Fixmo SafeZone" run-time 223 may be contained in a master container 220 and the "SafeZone Workspace Edition" expansion pack run-time 233 may be contained in a slave container 230. The master container 220 and the slave container 230 may form a container group 210. When the "SafeZone Workspace Edition" expansion pack run-time 233 is downloaded, the additional icons 610 shown in the landing screen 300 in FIG. 6 represent applications 234 that may be contained in the slave container 230 for the "SafeZone Workspace Edition" expansion pack run-time 233. Note that both the icons 410 for the "Fixmo SafeZone" run-time 223 and the icons 610 for the "SafeZone Workspace Edition" expansion pack run-time 233 appear in the same landing screen 300 in FIG. 6. As such, by including the master container applications 224, 410 of the "Fixmo SafeZone" run-time 223 and the slave container applications 234, 610 of the "SafeZone Workspace Edition" expansion pack run-time 233 in the same container group 210, the separation of master and slave containers 220, 230 is transparent to a user. That is, the landing screen 300 includes access to applications 224, 234 (via the icons 410, 610) from both the master and the slave containers 220, 230.

According to one embodiment, the present invention may be used to implement a dynamic container where individual applications can be added/removed. A container group 210 may support the ability to add only one containerized application (e.g., 234) at a time. This gives the user the perception that individual applications 234 can be added or removed from a single container 230. The master container 220 can detect the applications 234 in the slave container 230 dynamically as and when the slave container 230 is installed. If a slave container 230 is removed, all of the applications 234 within the slave container 230 will be removed and will no longer be accessible from the master container 220. This behaviour reflects an "app store" like capability of the container group 210.

According to one embodiment, the present invention may be used to implement software development kits ("SDK"). A container group 210 may have any number of containerized applications 224, 234 within its master or slave containers 220, 230. In the case where there are no containerized applications 224 in the master container 220, the master container 220 may act as a SDK. The slave containers 230 may then "plug in" to the master container 220 by using the SDK's API. That is, the number of containerized applications 224, 234 is zero to n in the master/slave containers 220, 230. In the SDK use case, the master container 220 may have zero containerized applications 224.

Thus, according to one embodiment of the invention, there is provided a method for managing application containers 220, 230, comprising: assigning a first application 224 to a master container 220 in a memory 24 of a system 10; assigning a second application 234 to a slave container 230 in the memory 24; using a processor 23, assigning the master and slave containers 220, 230 to a container group 210 by: delegating access to container meta-data of the slave container 230 by a container run-time 233 of the slave container or by the first application 234 to a container meta-data accessor 221 of the master container 220 via a class loader 225 of the master container 220; and, delegating interaction between the container run-time 233 of the slave container 230 and a container management channel 232 of the slave container 230 to a container management channel 222 of the master container 220 via the class loader 225 of the master container 220; and, accessing the first and second applications 224, 234 via the container group 210 (whereby the first and second applications 224, 234 appear to be in the container group 210 collectively rather than in the master and slave containers 220, 230 individually).

In the above method, the accessing of the first and second applications 224, 234 may be via a launcher for the container group 210. The launcher may be a user interface (e.g., 28, 300, 400) presented on a display screen 28 of the system 10. The user interface 28, 300, 400 may include first and second icons (e.g., 410, 610) for the first and second applications 224, 234, respectively. The container group 210 may include a run-time 215 of the container group 210. The slave container 230 may include a class loader 235 of the slave container 230, a container meta-data accessor 231 of the slave container 230, the container management channel 232 of the slave container 230, the container run-time 233 of the slave container 230, and the first application 234. The master container 220 may include the class loader 225 of the master container 220, the container meta-data accessor 221 of the master container 220, the container management channel 222 of the master container 220, a container run-time 223 of the master container 220, and the second application 234. The first application 224 may be zero or more first applications 224 and the second application 234 may be zero or more second applications 234. The slave container 230 may be one or more slave containers 234. And, the container group 210 may be a single logical group of containers 210.

The above embodiments may contribute to an improved method and system for managing and presenting multiple application containers 220, 230 and may provide one or more advantages. First, the containerized applications 224, 234 do not have to be aware whether they are to be executed in the master and/or slave container 220, 230 (e.g., "Write once run in either master or slave"). Second, the number of containerized applications 224, 234 is zero to n in the master/slave containers 220, 230 (e.g., in a SDK use case, the master container 220 may have zero containerized applications). Third, master and slave containers 220, 230 can be updated independently of each other as long as the API contract of container meta-data accessor and container management channel remains constant. Fourth, a slave container 230 containing only one containerized application gives the user the perception that individual applications are being added/removed from a single container. Fifth, a slave container 230 containing a set of containerized applications 234 gives the user the perception that an expansion pack is being added/removed where an expansion pack contains a set of containerized applications 234 that can be added (or removed) in addition to the set of applications 224 that is in the master container 220. Sixth, application container state and meta data (e.g., Locked/Unlock state, Policies, Key management, etc.) are implicitly shared among the containers 220, 230.

The embodiments of the invention described above are intended to be examples only. Those skilled in this art will understand that various modifications of detail may be made to these embodiments, all of which come within the scope of the invention.

What is claimed is:

1. A method for managing application containers, comprising:
    assigning a first application to a master container in a memory of a system;
    assigning a second application to a slave container in the memory;
    using a processor, assigning the master and slave containers to a container group by:
        delegating access to container meta-data of the slave container by a container run-time of the slave container or by the first application to a container meta-data accessor of the master container via a class loader of the master container, wherein delegating access includes the slave container receiving an instance of the container meta-data accessor of the master container; and,
        delegating interaction between the container run-time of the slave container and a container management channel of the slave container to a container management channel of the master container via the class loader of the master container, wherein delegating interaction includes the slave container receiving executable code that implements the container management channel of the master container; and,
    accessing the first and second applications via the container group.

2. The method of claim 1 wherein the accessing of the first and second applications is via a launcher for the container group.

3. The method of claim 2 wherein the launcher is a user interface presented on a display screen of the system.

4. The method of claim 3 wherein the user interface includes first and second icons for the first and second applications, respectively.

5. The method of claim 1 wherein the container group includes a run-time of the container group.

6. The method of claim 1 wherein the slave container includes a class loader of the slave container, a container meta-data accessor of the slave container, the container management channel of the slave container, the container run-time of the slave container, and the first application.

7. The method of claim 1 wherein the master container includes the class loader of the master container, the container meta-data accessor of the master container, the container management channel of the master container, a container run-time of the master container, and the second application.

8. The method of claim 1 wherein the first application is zero or more first applications and wherein the second application is zero or more second applications.

9. The method of claim 1 wherein the slave container is one or more slave containers.

10. The method of claim 1 wherein the container group is a single logical group of containers.

11. A system for managing application containers, comprising:
    a processor coupled to memory; and,
    one or more modules within the memory and executable by the processor for:
        assigning a first application to a master container in the memory;
        assigning a second application to a slave container in the memory;
        using the processor, assigning the master and slave containers to a container group by:
            delegating access to container meta-data of the slave container by a container run-time of the slave container or by the first application to a container meta-data accessor of the master container via a class loader of the master container, wherein delegating access includes the slave container receiving an instance of the container meta-data accessor of the master container; and,
            delegating interaction between the container run-time of the slave container and a container management channel of the slave container to a container management channel of the master container via the class loader of the master container, wherein delegating interaction includes the slave container receiving executable code that implements the container management channel of the master container; and,
        accessing the first and second applications via the container group.

12. The system of claim 11 wherein the accessing of the first and second applications is via a launcher for the container group.

13. The system of claim 12 wherein the launcher is a user interface presented on a display screen of the system.

14. The system of claim 13 wherein the user interface includes first and second icons for the first and second applications, respectively.

15. The system of claim 11 wherein the container group includes a run-time of the container group.

16. The system of claim 11 wherein the slave container includes a class loader of the slave container, a container meta-data accessor of the slave container, the container management channel of the slave container, the container run-time of the slave container, and the first application.

17. The system of claim 11 wherein the master container includes the class loader of the master container, the container meta-data accessor of the master container, the container management channel of the master container, a container run-time of the master container, and the second application.

18. The system of claim 11 wherein the first application is zero or more first applications and wherein the second application is zero or more second applications.

19. The system of claim 11 wherein the slave container is one or more slave containers.

20. The system of claim 11 wherein the container group is a single logical group of containers.

21. A method for managing application containers, comprising:

using a processor, assigning a master container in a memory of a system and a slave container in the memory to a container group by:

delegating access to container meta-data of the slave container by a container run-time of the slave container or by any application assigned to the master container to a container meta-data accessor of the master container via a class loader of the master container, wherein delegating access includes the slave container receiving an instance of the container meta-data accessor of the master container; and, delegating interaction between the container run-time of the slave container and a container management channel of the slave container to a container management channel of the master container via the class loader of the master container, wherein delegating interaction includes the slave container receiving executable code that implements the container management channel of the master container; and, accessing any application assigned to one or more of the master container and the slave container via the container group.

22. The method of claim 21 wherein any application is zero or more applications.

* * * * *